(12) United States Patent
Wang

(10) Patent No.: US 9,633,300 B2
(45) Date of Patent: Apr. 25, 2017

(54) APPARATUS HAVING COMMUNICATION MEANS AND A RECEIVING MEMBER FOR A CHIP CARD

(71) Applicant: Jian Wang, Sichuan (CN)

(72) Inventor: Jian Wang, Sichuan (CN)

(73) Assignee: certgate GmbH, Nürnberg (DE)

( * ) Notice: Subject to any disclaimer, the term of this patent is extended or adjusted under 35 U.S.C. 154(b) by 3 days.

(21) Appl. No.: 14/865,263

(22) Filed: Sep. 25, 2015

(65) Prior Publication Data

US 2016/0012327 A1    Jan. 14, 2016

Related U.S. Application Data

(63) Continuation of application No. PCT/EP2014/056592, filed on Apr. 2, 2014.

(30) Foreign Application Priority Data

Apr. 4, 2013   (DE) ........................ 10 2013 005 619

(51) Int. Cl.
*G06K 19/06* (2006.01)
*G06K 19/077* (2006.01)
*H04B 5/00* (2006.01)
*G06K 19/073* (2006.01)

(52) U.S. Cl.
CPC . *G06K 19/07739* (2013.01); *G06K 19/07345* (2013.01); *G06K 19/07741* (2013.01); *H04B 5/0056* (2013.01)

(58) Field of Classification Search
CPC ....... G06K 19/07345; G06K 19/07739; G06K 19/07741
USPC .................................................. 235/380, 492
See application file for complete search history.

(56) References Cited

U.S. PATENT DOCUMENTS

| 8,736,438 B1* | 5/2014 | Vasquez ................. B60R 25/24 340/426.11 |
| 2006/0255160 A1 | 11/2006 | Winkler |
| 2007/0145135 A1* | 6/2007 | Jogand-Coulomb G06K 7/10237 235/451 |
| 2007/0145152 A1 | 6/2007 | Jogand-Coulomb et al. |
| 2008/0099559 A1 | 5/2008 | Lo et al. |

(Continued)

FOREIGN PATENT DOCUMENTS

| CN | 101917216 A | 12/2010 |
| DE | 10 2010 061 351 A1 | 6/2012 |
| EP | 1 600 885 B1 | 2/2010 |

(Continued)

*Primary Examiner* — Seung Lee
(74) *Attorney, Agent, or Firm* — Reinhart Boerner; Van Deuren P.C.

(57) ABSTRACT

The invention relates to an apparatus (100) which comprises a receiving member (110) configured to receive a chip card (200). The chip card (200) is configured for contactless communication with a first hardware interface (311). The apparatus (100) further comprises communication means (120) configured to enable contactless communication with a second hardware interface (321), wherein the first hardware interface (311) and the second hardware interface (321) are hardware interfaces of different types. The communication means (120) are configured to enable a communication of the communication means (120) with the chip card (200) when the chip card (200) is received in the receiving member (110).

18 Claims, 2 Drawing Sheets

(56) References Cited

U.S. PATENT DOCUMENTS

2009/0061933 A1    3/2009  Lo et al.
2009/0065571 A1*  3/2009  Jain .................. G06K 19/07739
                                                                                 235/379

FOREIGN PATENT DOCUMENTS

| EP | 2 472 730 A1 | 7/2012 |
| JP | 2012123818 A | 6/2012 |
| JP | 2013-529019 A | 7/2013 |
| WO | WO 2009/075023 A1 | 6/2009 |

* cited by examiner

APPARATUS HAVING COMMUNICATION MEANS AND A RECEIVING MEMBER FOR A CHIP CARD

CROSS-REFERENCE TO RELATED PATENT APPLICATIONS

This patent application is a continuation of PCT/EP2014/056592, filed Apr. 2, 2014, which claims priority to German Application No. 10 2013 005 619.5, filed Apr. 4, 2013, the entire teachings and disclosure of which are incorporated herein by reference thereto.

FIELD OF THE INVENTION

The invention relates to an apparatus having a receiving member configured to receive a chip card.

BACKGROUND OF THE INVENTION

Chip cards are used in many different applications. One field of use is authentication, for example, in the context of electronic completion of banking transactions (online banking) or also at cash machines (ATMs). Another field of use is the use as a key for an electronic lock, for example, a motor vehicle lock or a lock on a building entrance. Chip cards are also used for storage and proof of credit, for example, credit for the use of telecommunication service offers. Chip cards often contain a store, a simple logic unit or a processor. The processing capacity of the processor may, for example, be used for processing programme code which may, for example, be stored in a memory of the chip card and which can serve different purposes.

In order to be able to access the chip card and to make it usable as a result, it must be possible to access the chip card, that is to say, the memory, the logic unit or the processor thereof, from the outer side. The access may either be contact-based or be contactless. The contact-based communication may be advantageous in technical security terms in some application situations. Furthermore, the complexity for enabling contact-based communication may be less. For contact-based communication, the chip card may be provided on a surface with contacts. However, contactless communication may be more comfortable for the user of the chip card in some application situations. Examples of contactless communication technologies which may be controllable by a chip card include Bluetooth, RFID (radio-frequency identification) and near field communication (NFC). So-called dual interface chip cards exist which are equipped both for contact-based communication and for contactless communication.

SUMMARY OF THE INVENTION

An object of the invention is to provide an apparatus which expands the possibilities for communication with a chip card.

This object is achieved according to the invention by an apparatus which comprises a receiving member configured to receive a chip card. The chip card is configured for contactless communication with a first hardware interface. The Apparatus further comprises communication means configured to enable contactless communication with a second hardware interface. The first hardware interface and the second hardware interface are hardware interfaces of different types. The communication means are configured to enable communication of the communication means with the chip card when the chip card is received in the receiving member.

If a chip card which is configured for contactless communication with a first hardware interface is received by the receiving member of an apparatus according to the invention, the communication means of the apparatus can communicate with the chip card. Since the communication means are configured to enable contactless communication with a second hardware interface, a communication between the second hardware interface and the chip card can thus be carried out by way of the communication means. Access to the chip card via the second hardware interface and the communication means is possible. It is possible in this instance to communicate with the chip card as if it were itself designed for communication with the second hardware interface. This communication possibility occurs in addition to the possibility to communicate with the chip card in a contactless manner via the first hardware interface. Since the first hardware interface and the second hardware interface are hardware interfaces of different types, the chip card is reachable via two different types of hardware interfaces. The possibilities of contactless communication with the chip card are expanded. In different operating situations, the hardware interface which is better suited in each case due to the specific properties thereof can be used to communicate with the chip card.

The apparatus according to the invention may in particular be a portable apparatus. It may be an independent apparatus which in any case is not permanently dependent on an external energy supply. The apparatus may be constructed in a spatially compact manner. To this end, in the context of an exemplary embodiment, it may operate without any display means and/or without any user input means, for example, buttons, dials or a touchscreen, that is to say, it may be constructed without any display and/or input means. In an exemplary embodiment, the dimensions of the apparatus are less than or equal to the dimensions provided for in accordance with the ISO standard 7810:2003 for a full-size chip card. This applies at least with respect to the surface-area of the apparatus. However, the dimensions of the apparatus, in particular the surface-area thereof, cannot be limited only by a current standard for the dimensions of chip cards, but instead the geometry of the apparatus may also correspond completely to a geometry prescribed by such a standard for chip cards or be completely dissociated from such a standard.

Chip cards contain at least one integrated circuit (IC), that is to say, a chip, which is arranged on a carrier, in particular a plastic carrier, or is embedded therein. The circuit may, for example, comprise a memory. The memory may be a non-volatile memory. The memory may be a read-only memory (ROM), a flash memory, an EEPROM (electrically erasable programmable read-only memory), a ferroelectric random access memory (FRAM) or a phase-change random access memory (PCRAM), to name but a few examples. Additionally or alternatively, the circuit may contain a volatile memory, for example, a volatile memory with random access (random access memory, RAM). Other examples of a circuit comprise a simple logic unit or a processor. A processor in this specification is intended to be understood inter alia to refer to control units, microprocessors, microcontrol units, such as microcontrollers, digital signal processors (DSP), application-specific integrated circuits (ASIC) or field programmable gate arrays (FPGAs).

Chip cards are known in different forms. One possible form is a SIM card (SIM=Subscriber Identity Module). The term "SIM card" in this instance includes different embodiments of SIM cards. These include, for example, mini-SIM cards, micro-SIM cards and nano-SIM cards. However, the chip card may, for example, also be a bank card or telephone card and have the geometry conventional for such chip cards in accordance with ISO 7816 ID-1.

That the chip card is configured for contactless communication may mean that it includes at least one component which is necessary in order to enable contactless communication with the chip card. However, all the components necessary for the contactless communication of the chip card do not have to be comprised of the chip card. For example, the chip card may comprise a control system, that is to say, a controller, which enables the contactless communication of the chip card, whilst an antenna which is additionally necessary for the communication is not a component of the chip card.

That the communication for which the chip card is configured is a contactless communication may mean that there is no direct physical connection present between the chip card and the first hardware interface so that the chip card can communicate with the first hardware interface. The contactless communication may also be referred to as wireless and contact-free. For the contactless communication, the chip card may, for example, correspond to one of the standards ISO 10536, ISO 14443 or ISO 15693. The communication may be unidirectional or bidirectional.

The term hardware interface makes it clear that the interface differs from a software interface alone, which serves, for example, to call up a programme component of a computer programme (application programming interface, API). The first hardware interface may comprise hardware components which are necessary for a contactless communication with the chip card.

Some of the possible examples of a first hardware interface are a Bluetooth interface, an NFC interface, an RFID interface, an interface to a wireless local network (wireless local area network, WLAN), a certified wireless USB interface (CWUSB) and an infrared interface (IR).

The first hardware interface is a hardware interface which is external with respect to the apparatus. It may, for example, be a component of a device which is different from the apparatus. An example of such a device is a PC (personal computer), for example, a desktop PC, a tablet PC or other types of portable PCs (notebooks, laptops). Other examples are mobile phones, for example, smartphones, personal digital assistants (PDA), games consoles, set-top boxes, electronic locks, for example, motor vehicle locks or building locks, cash machines (ATMs) and terminals, for example, credit card terminals.

The above explanations relating to the first hardware interface also apply with respect to the second hardware interface.

The configuration of the receiving member to receive a chip card may involve the receiving member being adapted to the chip card. In particular, it may be adapted to the geometry of the chip card. If the communication means of the Apparatus and the chip card are configured to communicate with each other in a contact-based manner when the chip card is received in the receiving member, the receiving member may have contacts which correspond to the contacts of the chip card. The receiving member may, for example, also comprise a lock, which must be in a locked state so that the chip card and communication means can communicate with each other—for example, since there is sufficiently good contact between contacts of the receiving member and contacts of the chip card only in the locked state.

The communication means of the apparatus may include all the components of the apparatus which serve the contactless communication with the second hardware interface.

For example, the communication means may include an antenna which is required for the communication with the second hardware interface. Another example of a component which may belong to the communication means is a controller. This may, for example, have the function, when data are received from the second hardware interface, for example, via an antenna of the communication means, in accordance with the protocol used by the second hardware interface, of extracting a useful piece of information (payload) transmitted via the second hardware interface from the received data. On the other hand, the controller may have the function of preparing a useful piece of information in accordance with the protocol when it is to be transmitted from the apparatus or from a received chip card to the second hardware interface. In order to cause the actual transmission in the direction of the second hardware interface, the controller may, for example, generate a corresponding signal and, for example, supply it to an antenna of the communication means, so that it transmits it. The communication means may be understood to be a hardware interface of the apparatus which corresponds to the second hardware interface.

That the first hardware interface and the second hardware interface are hardware interfaces of different types may in particular include the fact that the communication means are configured to enable communication only with the second hardware interface, but are not configured to enable communication with the first hardware interface. The communication means then correspond only to the second hardware interface, but not to the first hardware interface. Accordingly, the chip card may be configured to enable only communication with the first hardware interface, but not be configured to enable communication with the second hardware interface. If the first hardware interface is, for example, one of the hardware interfaces mentioned above by way of example (Bluetooth, NFC, RFID, WLAN, CWUSB, IR), the second hardware interface, due to the different type thereof, may be another of the above hardware interfaces.

That the communication means are configured to enable communication of the communication means with the chip card when it is received in the receiving member may mean that a communication of the second hardware interface with the chip card can be carried out directly via the communication means, without additional communication components having to be connected in between. Direct access to the chip card by the communication means is possible. This differentiates the invention from systems in which there is connected between the communication means and the chip card, for example, a processor which, for example, performs functions other than communication with the chip card and which must be activated so that a communication can take place with the chip card. In contrast, according to the invention it is possible to communicate with the chip card as if it were itself designed for communication with the second hardware interface. For the second hardware interface, it cannot be envisaged that the chip card itself is not configured for communication with the second hardware interface.

That the communication means are configured to enable communication of the communication means with the chip card when it is received in the receiving member may involve all the components for the communication with the chip card being present on the part of the communication means—at least when a conductive connection exists between the chip card or the receiving member and the communication means, as may be necessary for the contact-based communication with the chip card. For example, the communication means may comprise a controller configured to communicate with the chip card. This controller may at the same time be configured to enable the contactless communication with the second hardware interface.

Alternatively, to this end, another controller may be included in the communication means. The communication means may be configured to control both a protocol for the communication with the second hardware interface and a protocol for the communication with the chip card. The communication may involve a unidirectional or bidirectional data exchange.

That the communication of the communication means with the chip card is possible when it is received in the receiving member includes that, optionally above and beyond merely inserting or introducing the chip card into the receiving member in another manner, other steps have to be carried out before the communication between the chip card and communication means is possible. Such a step may, for example, be locking the chip card in the receiving member, for example, so that sufficient contact is produced between chip card and receiving member.

According to one exemplary embodiment, the chip card is useable for security purposes.

Examples of such security purposes are inter alia encryption purposes. If the chip card is useable for security purposes, it can also be referred to as a secure element.

For example, in a memory of the chip card, a unique identifier may be stored which identifies the owner of the chip card and by means of which he authenticates himself with respect to another entity. A field of use for this is, for example, access control to motor vehicles or buildings, access being granted only after successful authentication, or also logging on to a computer. The chip card may also be usable in the context of a dual factor authentication, in which, for example, in addition to the chip card, a personal identification number (PIN) is required, as required, for example, in most cases for the use of cash machines (ATMs). There are many other examples. However, a unique identifier may also be used, for example, for the electronic signature of a document. The identifier may, for example, be a private key of the owner of the chip card which, together with a public key, forms an asymmetrical key pair. The key pair may, for example, be an RSA key pair (RSA=Rivest, Shamir, Adleman). However, there may also be, for example, a secret key stored on the chip card which is useable for the symmetrical encryption or decryption, for example, of documents or a communication. A processor which may also be comprised of the chip card may be able to be used for security purposes, in particular for identification purposes and/or for authentication purposes and/or for encryption purposes. For example, the processor may perform encrypting operations or, during operation in the context of a challenge/response method, it may be involved in the generation of the response to the challenge set.

According to one exemplary embodiment in which the chip card can be used for security purposes, the Apparatus forms a token when the chip card is received in the receiving member.

If the chip card is received in the receiving member, since the chip card is useable for security purposes, the apparatus according to the invention can also be considered to be useable for security purposes. Portable apparatuses useable for security purposes, in particular those which are useable for identification purposes and/or authentication purposes, are referred to as tokens or security tokens. Tokens exist in different forms, which are all included here. Some examples of such forms are, for example, the construction of the token as a key ring and configurations which resemble conventional memory sticks, for example, USB sticks (USB=Universal Serial Bus).

According to one exemplary embodiment, the chip card is configured for contact-based communication and the apparatus is configured to enable contact-based communication with the chip card when the chip card is received in the receiving member.

The contact-based communication of the communication means with the chip card may be advantageous since contact-based communication may be able to be carried out in a more simple and secure manner in comparison with contactless communication.

Since, in the context of this exemplary embodiment, the chip card is configured both for contactless communication with a first hardware interface and for contact-based communication, the chip card in this exemplary embodiment is a so-called dual interface chip card. An example of such a dual interface chip card is a chip card which is equipped both for contact-based communication in accordance with ISO 7816 and for contactless communication in accordance with ISO 14443. The configuration of the chip card for contact-based communication may involve the chip card having contacts which can be contacted from the outer side, for example, since they are arranged on a surface of the chip card. The configuration of the apparatus to enable contact-based communication with the chip card may involve contacts for contacting the chip card being present on the part of the apparatus, for example, in the receiving member of the apparatus, and a conductive connection being provided between the contacts of the Apparatus and the communication means.

According to one exemplary embodiment, the contactless communication for which the chip card is configured is a contactless communication having a smaller range than the range of the contactless communication which the communication means are configured to enable.

Due to the different ranges, the communication means enable a larger communication range compared with the contactless communication, for which the chip card itself is configured. By the use of the exemplary embodiment of the apparatus according to the invention, the communication with the chip card may thus be possible over a greater distance.

According to one exemplary embodiment, the contactless communication for which the chip card is configured is a passive communication and the contactless communication which the communication means are configured to enable is an active communication.

Chip cards which are configured for contactless communication are often configured only for passive contactless communication since this may be possible with less complexity than the configuration for active communication. One reason for this is that, for passive communication, no energy supply means, for example, a capacitor or a battery, have to be provided by the chip card. However, the range and transmission rate in passive communication are often limited with respect to active communication. If the communication means of the apparatus according to the invention are configured to enable active contactless communication, it is thus possible to enable communication with the chip card over a greater distance and at a higher transmission rate by the use of the apparatus.

Passive communication may in this instance in particular be understood to be a communication in which a communication partner requires no separate energy supply in order to perform the communication. It can obtain the energy required for the communication, for example, from an electrical field of another communication partner which is connected to an energy supply. Examples of communication techniques which permit a passive communication partner include NFC and RFID. Accordingly, active communication may be understood to be a communication in which both communication partners have to be connected to an energy supply in order to be able to perform the communication.

That the chip card is configured for passive contactless communication means that the chip card is configured in passive communication to act as the passive communication partner.

According to one exemplary embodiment, the apparatus comprises energy supply means.

Due to the energy supply means, it is possible for communication means configured to enable active contactless communication with the second hardware interface to be able to be provided and for the apparatus to nonetheless remain independent of an external energy supply so that it may constitute an independent apparatus.

The energy supply means may comprise, for example, a capacitor, a battery, an accumulator or a solar cell. The energy supply means may be associated with the communication means, in particular may be connected thereto. There may be provision for the apparatus to be configured for charging the energy supply means. For example, the apparatus may comprise a coil which is associated with the energy supply means and by means of which energy can be supplied to the energy supply means for charging by means of induction.

According to one exemplary embodiment, the contactless communication for which the chip card is configured is a contactless communication at a lower transmission rate than the transmission rate of the contactless communication which the communication means are configured to enable.

Due to the different transmission rates, the communication means, with respect to contactless communication for which the chip card itself is configured, enable a higher transmission rate. By the use of the exemplary embodiment of the apparatus according to the invention, thus, more rapid communication with the chip card may become possible.

According to one exemplary embodiment, the communication means are configured to enable a Bluetooth communication with the second hardware interface.

The second hardware interface in the context of this exemplary embodiment may be referred to as a Bluetooth interface. The communication means may be referred to as Bluetooth communication means. Bluetooth interfaces are currently provided on many Apparatuses of different types. For example, a large number of smartphones, laptops and tablet PCs have a Bluetooth interface. By the apparatus according to the embodiment, access to the chip card using such apparatuses becomes possible. A terminal which is specifically designed for access to the chip card can then be dispensed with. In comparison with other contactlessly operating communication technologies, for example, NFC, Bluetooth offers a higher transmission rate and a larger range. For example, the range may be up to 100 m and the transmission rate several MBit/s.

The term Bluetooth communication is intended in this instance to include communication in accordance with the Bluetooth-Low-Energy standard (BLE). In the context of the invention, it may be advantageous to configure the communication means as communication means for communication in accordance with the BLE standard since this may result in a comparatively low energy requirement of the communication means. This may enable smaller sizing of the energy consumption capacity of the energy storage means which may be required for the operation of Bluetooth communication means by the apparatus. Energy storage means having a lower energy storage capacity may be distinguished with respect to energy storage means having a larger energy storage capacity by smaller dimensions. Therefore, they may be able to be integrated in a apparatus according to the invention in a more simple manner. When BLE is used, no pairing is further required so that access by several systems to the chip card becomes possible.

According to one exemplary embodiment, the contactless communication for which the chip card is configured is a near field communication (NFC).

The first hardware interface, in the context of this exemplary embodiment, may be referred to as an NFC interface. The near field communication is a technique for which many chip cards are already configured. It can bring advantages of comfort in use in different application fields. At the same time, by means of NFC, a passive communication can be carried out. The chip card according to the invention may thus be configured for passive contactless near field communication, that is to say, act as the passive communication partner in near field communication so that for the near field communication no energy has to be provided by the apparatus according to the invention. The range with the near field communication is often only in the order of magnitude of a few centimetres and the maximum transmission rate is below 0.5 Mbit/s.

It may be considered to be particularly advantageous for the communication means to be configured to enable a Bluetooth communication with the second hardware interface and, at the same time, for the contactless communication for which the chip card is configured to be a near field communication. It is then possible to access the chip card by means of near field communication or, on the other hand, by means of the apparatus, access can be carried out by means of Bluetooth. A communication with the chip card having a larger range and a higher transmission rate than with near field communication becomes possible. Near field communication and Bluetooth communication can complement each other particularly well.

For example, the apparatus may then be used in order to initialise or personalise the chip card by means of Bluetooth communication. Software can be installed, configured or deleted on the chip card by means of Bluetooth communication. The blocking or unblocking of the chip card, charging with credit or interrogation of the status of the chip card can also be carried out by means of Bluetooth. All these actions can therefore be carried out wirelessly Over The Air (OTA). Other everyday uses of the chip card, for example, in payment applications, access control applications and electronic travel ticket or entry ticket applications, can in contrast be carried out by means of near field communication. However, the Bluetooth communication can also be used in the context of the above applications. If the apparatus forms a token, when the chip card is received in the receiving member, the token functionality may be useable not only via NFC, but also via Bluetooth, for example, an electronic signature can be carried out via a Bluetooth communication by means of the token, an authentication can be carried out, a transaction can be approved, a payment can be activated or data can be encrypted or decrypted. Also, the functionalities and applications which are set out above in connection with the use via Bluetooth may also be useable via NFC. Generally, the listing of the functionalities and applications at this point is by no means conclusive, but there are a number of other examples, which are not mentioned here only for reasons of clarity. According to one exemplary embodiment, the apparatus comprises additional communication means configured to enable the contactless communication of the chip card with the first hardware interface.

The chip card may be configured for contactless communication with the first hardware interface, without comprising all the means necessary for this communication. The additional communication means may complement the configuration of the chip card for the contactless communication with the first hardware interface and thus enable the communication with the first hardware interface. The additional communication means then do not have to be provided externally with respect to the chip card and Apparatus according to the invention.

The additional communication means may, for example, comprise an antenna which is required for the communication of the chip card with the first hardware interface, but which is not comprised of the chip card itself. A controller which is required for the communication of the chip card with the first hardware interface may, on the other hand, be provided by the chip card and may provide the configuration of the chip card for the contactless communication with the first hardware interface.

According to one exemplary embodiment, the additional communication means are at least partially deactivatable.

By at least partial deactivating the additional communication means, the communication of the first hardware interface with terms of security since access to the chip card via the first hardware interface is then impossible.

The at least partial ability to deactivate the additional communication means may mean in this instance that, in the deactivated state, the additional communication means are not useable so that communication of the chip card with the first hardware interface is not possible. The ability to be deactivated may, for example, be provided by a switch which is comprised of the apparatus according to the invention. This may be configured to provide or to interrupt a connection between the chip card and the additional communication means so that, in the interrupted state, the additional communication means are not useable. However, an electronic component of the additional communication means may also be switched off, for example, by means of separation from an energy supply. The additional communication means may at least partially be mechanically deactivatable. The ability to be mechanically deactivated may have the advantage that the deactivation and optionally the reactivation can be carried out in a simple manner, in particular without specific knowledge of the operator. For example, in the case of a switch provided for deactivation/reactivation, a mechanically actuatable actuation element may be provided, by means of which the switch can be moved from one switching state into the other.

According to one exemplary embodiment, the chip card is received in the apparatus.

For example, the chip card is permanently received in the apparatus. For example, the chip card is permanently received in the receiving member (and thus permanently received in the apparatus). For example, the apparatus and the chip card permanently received in the apparatus form a token, in particular a security token, as described above.

The chip card is for example to be understood to be received in the receiving member, if it is non-detachable connected with the receiving member. A non-detachable connection is only separable by destruction. Examples for non-detachable connections are adhesive bonds, solder connections, welded connections, bond connections and rivet connections.

If the communication means of the apparatus and the chip card are configured, as described above, to communicate contact based with each other, when the chip card is received in the receiving member, the receiving member may comprise contacts corresponding to the contacts of the chip card. For example, the contacts of the chip card are soldered up or bonded (e.g. by use of conductive adhesive) with the corresponding contacts of the receiving member, so that the chip card is received permanently in the receiving member. This is for example advantageous to ensure an as good as possible electrical contact between the chip card and the apparatus and to prevent a disconnection of the chip card and the apparatus.

The installation space of the apparatus configured to receive the chip card is for example to be understood to be the receiving member. For example, in this installation space, there are no further elements of the apparatus arranged, so that the chip card is receivable therein. For example, the apparatus may comprise a circuit board with contacts for contacting the chip card. For example, the installation space in which the chip card is located, when the chip card is connected to the corresponding contacts of the circuit board, may be understood to be a receiving member. For example, in this installation space no further elements are arranged on the circuit board.

According to one exemplary embodiment, the apparatus is part of a vehicle key. For example, the apparatus is formed as a vehicle key and/or arranged in a vehicle key as a component of the vehicle key.

For example, the apparatus together with the chip card is configured to authenticate the owner of the apparatus, the user of the apparatus and/or the possessor of the apparatus to a vehicle locking system. Furthermore, the apparatus together with the chip card is for example configured to authenticate the owner, user and/or possessor of the apparatus to other systems such as a building locking system, a parking management system, a back office-system and/or a management system.

For example, the chip card and/or the additional communication means and/or the communication means are configured for contactless communication with a vehicle locking system of a vehicle and/or other systems. For example, the chip card and/or the additional communication means support, as described above, a NFC-communication. For example, the communication means support, as described above, a Bluetooth-communication. This is for example advantageous to support different communication protocols and to enable a compatibility as high as possible with a plurality of other existing systems.

In a memory of the chip card may for example be stored a unique identifier which identifies the owner, user and/or possessor of the chip card and/or the apparatus and with which he may authenticate himself to a vehicle locking system.

For example, the unique identifier may be directly communicated (e.g. sent) to the vehicle locking system by the chip card and/or the additional communication means and/or the communication means. For example, the vehicle is only opened and/or a immobilizer of the vehicle is only deactivated, if the vehicle locking system recognizes the owner of the apparatus to be authorised to open the vehicle by the unique identifier.

In contrast to mechanic vehicle keys, this is for example advantageous, if the vehicle key, of which the apparatus is a part, does not only serve for authenticating to one vehicle but a plurality of vehicles (e.g. a plurality of vehicles of a car-sharing provider). For example, the unique identifier may be programmed in all vehicle locking systems of the vehicles, so that the user group of the vehicles may be expanded or reduced by adapting the programming.

For example, the owner, user and/or possessor of the chip card and/or the apparatus may authenticate himself with the unique identifier to one or more other systems. Alternatively, in a memory of the chip card at least one further unique identifier may be stored which identifies the owner of the chip card and with which he may authenticate himself to the other systems. For example, the unique identifier may be directly communicated (e.g. sent) to the other systems by the chip card and/or the additional communication means and/or the communication means.

This is for example advantagoues to allow a use of the apparatus as efficient as possible in different application areas. For example, the apparatus may not only be used by the owner, user and/or possessor of the apparatus for authentication to a vehicle locking system, but also for payment (e.g. of parking fees).

The unique identifier is for example assigned to one person or a group of persons. An example for a unique identifier is a user certificate and/or one or more keys. As described above, the idenfier may for example be a private key of the owner of the chip card, which forms together with a public key an asymmetric key pair. It may for example also be a secret key stored on the chip card, which is useable for the symmetric encryption, e.g. of documents or communication. Also a processor comprised of the chip card may by useable for security purposes, in particular for identification purposes and/or authentification purposes and/or encryption purposes. For example, the processor may perform encrpytion operations or may take part in generating a response on a challenge in the context of challenge-response-methods.

In an exemplary embodiment, apparatus is used for authentication to a vehicle locking system.

BRIEF DESCRIPTION OF THE DRAWINGS

Exemplary embodiments of the invention are explained below with reference to four Figures, in which shows:

FIG. 2b is a schematic illustration of components inside the chip card from FIG. 2a;

DETAILED DESCRIPTION OF THE INVENTION

Figure 1:
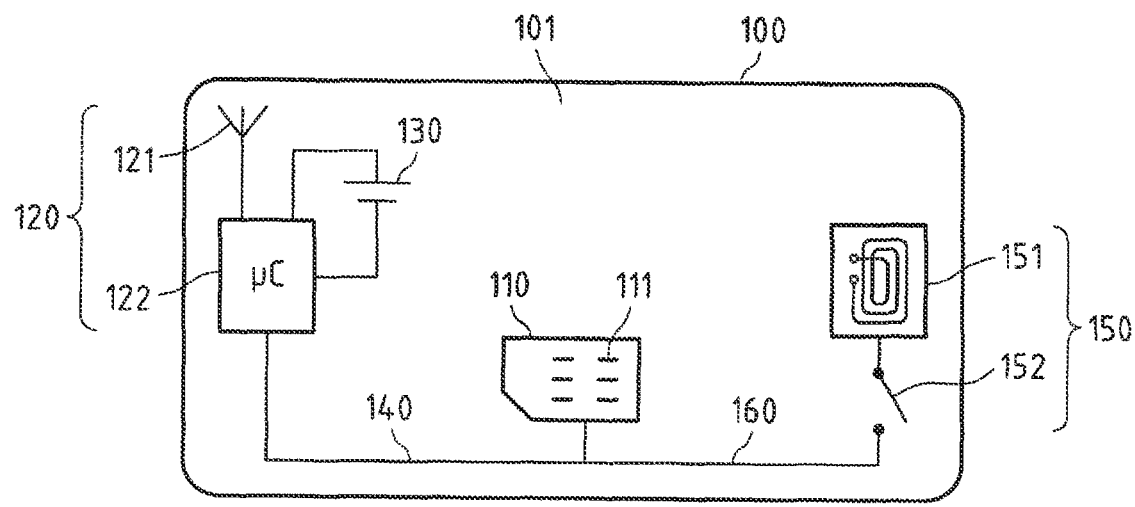
FIG. 1 is a schematic illustration of an exemplary embodiment of an apparatus according to the invention.

FIG. 1 is a schematic illustration of an exemplary embodiment of an apparatus 100 according to the invention.

The apparatus 100 has a receiving member 110 for a micro-SIM card, referred to below simply as a SIM card. In the receiving member 110 there are arranged contacts 111 which contact the contacts of a SIM card when the SIM card is received in the receiving member 110. The apparatus 100 further comprises Bluetooth communication means 120. These are configured for communication in accordance with the Bluetooth Low Energy standard. The Bluetooth communication means 120 comprise a Bluetooth antenna 121 and a microcontroller 122. In order to supply energy to the microcontroller 122, a battery 130 is provided. The battery 130 is a disposable battery. Alternatively, however, a rechargeable battery can also be used. In order to recharge the battery, the apparatus 100 may then comprise a coil (not shown) by means of which the battery can be charged in an inductive manner. The Bluetooth communication means 120 are connected to the contacts 111 of the receiving member 110 by connection 140. The apparatus 100 further comprises NFC communication means 150. These include an NFC antenna 151 and a switch 152. The switch 152 can be mechanically actuated by means of a sliding member (not shown). In the closed state of the switch 152, the NFC antenna 151 is connected to the contacts 111 of the receiving member 110 by connection 160. By means of the Bluetooth communication means 120, communication of a SIM card which is received in the receiving member 110 with a Bluetooth interface is enabled. In accordance with the Bluetooth technology, this communication is carried out in a contactless manner. By means of the NFC communication means 150, a similarly contactless communication of a SIM card which is received in the receiving member 110 with an NFC interface is enabled when the switch 152 is closed. Display means or user input means are not comprised of the apparatus 100.

The components of the apparatus 100—including the microcontroller 122 as an integrated circuit—are integrated in a plastic carrier 101.

Figure 2A:
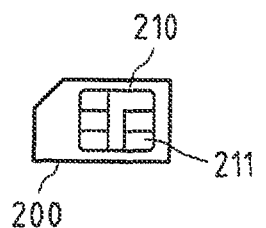
FIG. 2a is a schematic illustration of an example of a chip card which is receivable in a receiving member of the apparatus from FIG. 1.

FIG. 2a shows a schematic illustration of an example of a micro-SIM card 200, which is receivable in the receiving member 110 of the apparatus 100 from FIG. 1. The SIM card 200 has on a surface a contact face 210 which has a plurality of contacts 211.

Figure 2B:
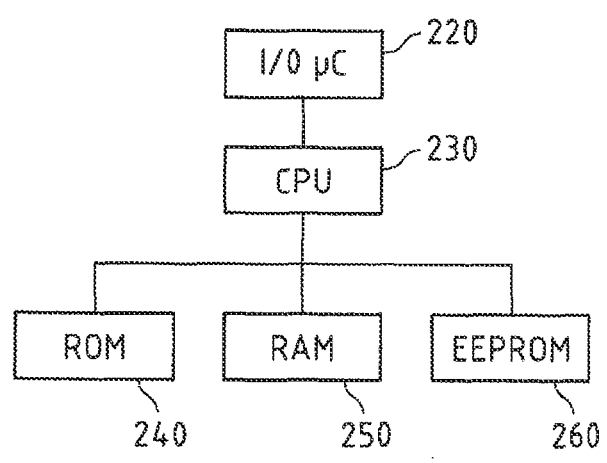

FIG. 2b shows a schematic illustration of components inside the chip card 200 from FIG. 2a.

The chip card 200 comprises an input/output microcontroller (I/O μC) 220, a processor (central processing unit, CPU) 230, 30 a ROM 240, a RAM 250 and an EEPROM 260. Instead of the EEPROM 260 or in addition thereto, also a flash memory may, for example, be provided. The microcontroller 220 is connected to the processor 230 so that a data exchange between the microcontroller 220 and the processor 230 is possible. The processor 230 is further connected to the ROM 240, the RAM 250 and the EEPROM 260 so that it can access these components. The SIM card 200 is a so-called dual interface chip card, which is configured both for contact-based communication according to ISO 7816 and for contactless communication according to ISO 14443. To this end, the microcontroller 220 was configured accordingly and a connection of the microcontroller 220 to the contacts 211 of the SIM card 200 was provided.

A unique identifier of the SIM card 200 predetermined by the manufacturer is stored in the ROM 240. In order to execute a software programme on the processor 230, the programme code is first loaded in the RAM 250. Operands are also deposited in the RAM 250 whilst the programme is executed. Software programmes and data which the user stores on the SIM card 200 are stored in the EEPROM 260. The connection of the ROM 240, the RAM 250 and the EEPROM 260 to the microcontroller 220 is provided via the processor 230.

The SIM card 200 is useable for security purposes. It can therefore also be referred to as a secure element. For example, it may be usable for identification purposes and/or authentication purposes and/or for encryption purposes. For example, the unique identifier of the SIM card 200, which identifier is predetermined by the manufacturer and stored in the ROM 240, can be used for access control by being transmitted from the SIM card 200 to a corresponding access terminal. In a similar manner, it can, for example, also be used to gain access to a computer. It can also be used, for example, together with a PIN for dual factor authentication, for example, in order to cause a withdrawal at a cash machine (ATM). According to another example, a private key of an RSA key pair may be stored in the EEPROM 260 and be used for the electronic signature of documents. However, a secret key for the symmetrical encryption or decryption can also be stored on the SIM card 200. In the context of another example, the processor 230 when it executes a computer programme stored in the EEPROM 260, can perform an encryption or decryption operation or in the context of a challenge/response method be involved in the generation of the response.

Figure 3:
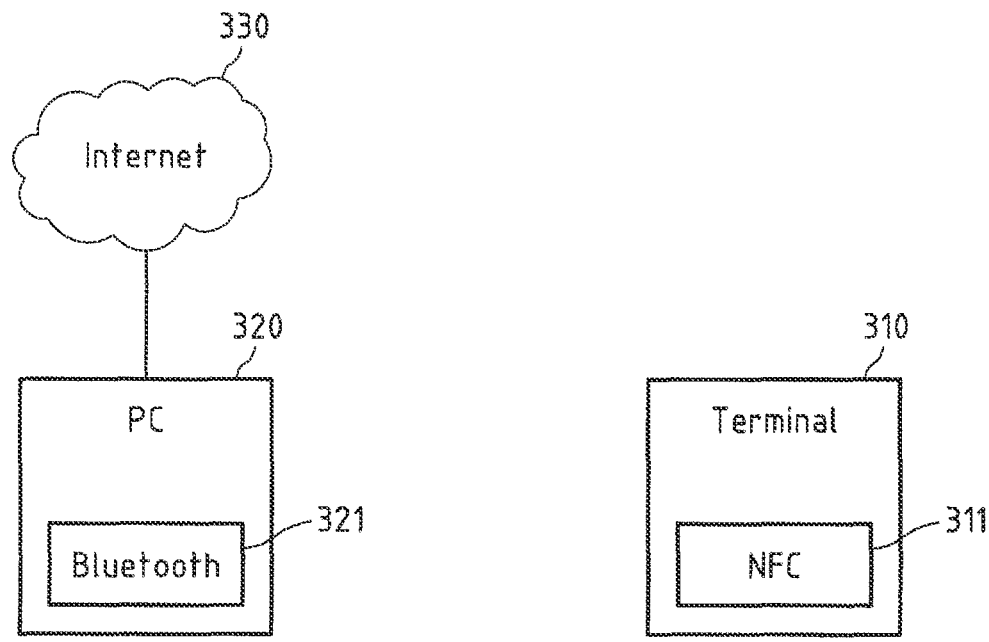
FIG. 3 is a schematic illustration of the apparatus from FIG. 1, wherein the chip card of FIG. 2a and FIG. 2b bare received in the receiving member, in the context of an example of an environment for the use of the apparatus and chip card.
Figure 3:
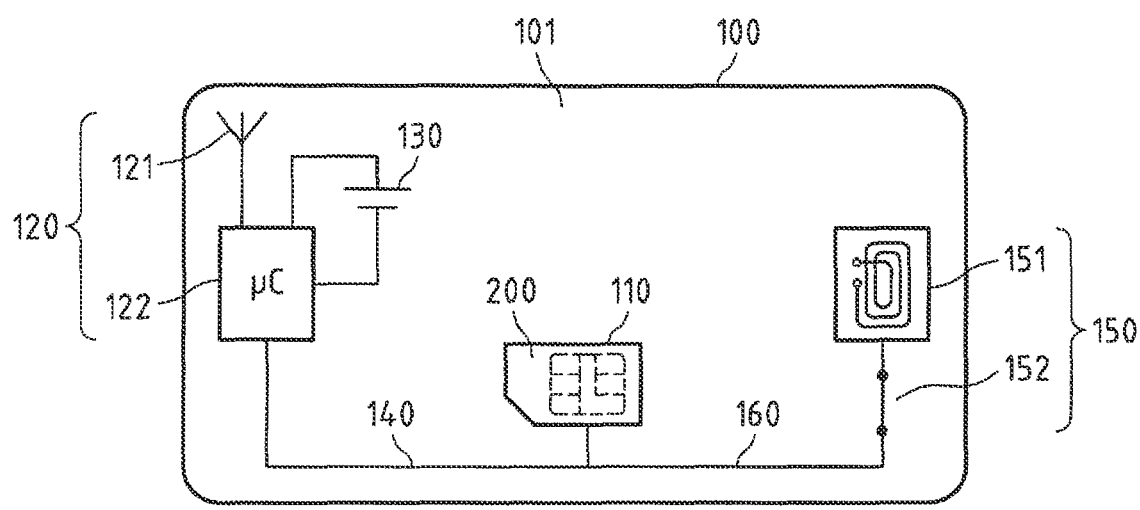

FIG. 3 shows a schematic illustration of the apparatus 100 from FIG. 1, wherein the SIM card 200 from FIG. 2a and FIG. 2b is received in the receiving member 110, in the context of an example of an environment for the use of the apparatus 100 and SIM card 200.

The contacts 211 of the SIM card 200 are in abutment with the contacts 111 of the receiving member 110. The receiving member 110 may comprise a lock (not shown in FIG. 3) which in a locked state ensures good contact between the contacts 111 and the contacts 211 of the SIM card 200. As explained above, the SIM card 200 is useable for security purposes so that the apparatus 100 forms a token when the SIM card 200 is received in the receiving member 110. In contrast to FIG. 1a, the switch 152 is closed in FIG. 3 so that in FIG. 3 a connection of the NFC antenna 151 to the contacts 111 of the receiving member 110 and, thus, to the SIM card 200 is provided.

FIG. 3 shows a terminal 310 which is external with respect to the apparatus 100 and a PC 320 which is also external with respect to the apparatus 100. The terminal 310 comprises an NFC hardware interface 311. The PC 320 comprises a Bluetooth hardware interface 321. The PC 320 is connected to the internet 330. In contrast to what is shown in FIG. 3, the terminal 310 may of course also be connected to the internet 330. The terminal 310 and the PC 320 in this instance represent other apparatuses which may comprise corresponding hardware interfaces.

The microcontroller 122 of the Bluetooth communication means 120 is configured both for the Bluetooth communication and for the contact-based communication with a SIM card. It controls protocols for Bluetooth communication and for contact-based communication with SIM cards. Furthermore, it may in each case generate and also process corresponding electrical output signals. The electrical connection between the SIM card 200 and the Bluetooth communication means 120 is provided by the contacts 111 and the connection 140. The apparatus 100 is thus configured to enable a contact-based communication with the SIM card 200 when the SIM card 200 is received in the receiving member 110. By the contact-based connection of the SIM card 200 to the Bluetooth communication means 120, secure communication between the SIM card 200 and the Bluetooth communication means 120 is brought about with little implementation complexity.

The NFC communication means 150 form additional communication means with respect to the Bluetooth communication means 120. If the switch 152 is closed and the SIM card 200 is received in the receiving member 110, the SIM card is connected to the NFC antenna 151. The NFC antenna then enables the contactless communication of the SIM card 200 with the NFC interface 311. A decoupling of the NFC antenna 151 from the receiving member 110 and consequently from the SIM card 200 can be performed in a simple manner. To this end, the switch 152 must simply be moved into the open state in a mechanical manner. The NFC antenna 151 is then no longer be useable, that is to say, it is deactivated. An undesirable NFC communication between the terminal 310 or the NFC interface 311 thereof and the SIM card 200 is then impossible. The security is increased.

If the SIM card 200 is received in the receiving member 110, the apparatus 100 can expand the possibilities for communication with the SIM card 200. It is possible not only to perform an NFC communication which is supported by the SIM card 200 in a native manner, but also a Bluetooth communication with the SIM card 200.

The Bluetooth communication of the Bluetooth interface 321 with the SIM card 200 can be performed directly via the Bluetooth communication means 120, without other communication components having to be connected in between. The reason for this is that, from the Bluetooth communication means 120, all the components for the contact-based communication with the SIM card 200 and the Bluetooth communication with the Bluetooth interface 321 are present. In particular, the controller 122 controls protocols for Bluetooth communication and for contact-based communication with SIM cards. Direct access to the SIM card 200 by the Bluetooth communication means 120 is possible. It is therefore possible to communicate with the SIM card 200 as if it were itself designed for communication with the Bluetooth interface 321. For the Bluetooth interface 321, it cannot be envisaged that the SIM card 200 is not itself configured for the communication with the Bluetooth interface 321.

NFC communication and Bluetooth communication complement each other particularly well. For instance, the range and transmission rate of the Bluetooth communication enabled by the Bluetooth communication means 120 are greater than with the NFC communication for which the SIM card 200 is configured in addition to contact-based communication. In contrast, the NFC communication has the advantage that it allows passive communication, that is to say, communication in which a communication partner for performing the communication does not require an own energy supply. In this instance, the SIM card 200 is configured for passive NFC communication. It thus acts as the passive communication partner in the NFC communication. For the NFC communication with the NFC interface 311, no energy supply is required by the SIM card 200 or the apparatus 100. The energy required for the NFC communication is obtained from an electrical field generated by the NFC interface 311 during the communication with the NFC interface 311 of the terminal 310. For the Bluetooth communication, which is an active communication, so that an energy supply is required by all of the communication partners involved, the battery 130 supplies the microcontroller 121 of the Bluetooth communication means 120. However, the necessary energy storage capacity of the battery 130 can be reduced with respect to a case in which, in addition to a Bluetooth communication, another active communication has to be enabled. A reduced spatial requirement may result. For the same reason, it is also advantageous for the Bluetooth communication means 120 to be configured for communication in accordance with the BLE standard.

Terminals which are configured in the same manner as the terminal 310 for the NFC communication with chip cards are used in large numbers and for a great variety of purposes. A small selection of examples include payment applications, access control applications and electronic travel ticket or entry ticket applications. In the context of such applications, the SIM card 200 can interact with the terminal 310 by means of NFC communication. If the SIM card 200 is received in the receiving member 110 of the apparatus 100, it is possible to access it additionally via Bluetooth. The advantages of Bluetooth with respect to NFC with regard to the range and the transmission rate become usable. In addition, Bluetooth interfaces, such as the interface 321, are available in very many apparatuses, such as, for example, PCs or smartphones.

For applications in which a larger range and a higher transmission rate are advantageous, the Bluetooth communication with the SIM card 200 can be used. It is thus possible, for example, via the PC 320 and the Bluetooth interface 321, to perform an initialisation, a personalisation, a blocking or an unblocking of the SIM card 200. In this instance, display means, for example, a screen, and input means of the PC 320, for example, a mouse and a keyboard, may be used for comfortable interaction with the SIM card 200. For the installation of the software on the SIM card 200 and for the configuration or deletion of this software, the SIM card 200 may be accessed by means of apparatus 100 by the PC 320 via Bluetooth. Since the PC 320 is connected to the Internet 330, remote access to the SIM card 200 can be performed via the internet 330, the PC 320 and the apparatus 100. By the PC 320, for example, software or media files from the internet 330 can also be loaded and stored on the SIM card 200, in particular in the EEPROM 260. The functionalities and applications listed here in connection with the use via Bluetooth may also be usable via NFC. The same applies to the reverse case.

Generally, the listing of the functionalities and applications at this point is in no way definitive, but there are a large number of other examples, which are not set out here only for reasons of clarity.

The apparatus 100 is portable and can function independently. For the operation thereof, the Apparatus 100 is not dependent on an external energy supply since the NFC communication can be performed in a passive manner and an energy supply of the apparatus 100 is comprised with the battery 130 for the Bluetooth communication means 120. The Apparatus 100 comprises all the components which are necessary to enable the Bluetooth communication and the NFC communication with the SIM card 200. Due to this embodiment, the communication possibilities of the SIM card 200 can be expanded by the apparatus 100, wherein the apparatus 100 together with the SIM card 200 may be handled just as well as the SIM card 100 alone.

The invention claimed is:

1. Apparatus comprising:
a receiving member configured to receive a dual-interface chip card, wherein said chip card is configured for both contact-based communication and for contactless communication with a first hardware interface,
communication means configured to enable contactless communication with a second hardware interface, wherein said first hardware interface and said second hardware interface are hardware interfaces of different types, wherein said communication means are configured to enable contact-based communication of said communication means with said chip card such that, when said chip card is received in said receiving member, a communication of said second hardware interface with said chip card can be carried out directly via said communication means.

2. Apparatus according to claim 1, wherein said communication of said second hardware interface with said chip card can be carried out directly via said communication means, without additional communication components having to be connected in between.

3. Apparatus according to claim 1, wherein access to said chip card via said second hardware interface and said communication means is possible as if said chip card were itself designed for communication with said second hardware interface.

4. Apparatus according to claim 1, wherein said chip card is useable for security purposes.

5. Apparatus according to claim 4, wherein said apparatus forms a token when said chip card is received in said receiving member.

6. Apparatus according to claim 1, wherein said communication means are a hardware interface corresponding to the second hardware interface comprising an antenna and a controller.

7. Apparatus according to claim 1, wherein said contactless communication for which said chip card is configured is a contactless communication having a smaller range than said range of said contactless communication which said communication means are configured to enable.

8. Apparatus according to claim 1, wherein said contactless communication for which said chip card is configured is a contactless communication having a smaller transmission rate than said transmission rate of said contactless communication which said communication means are configured to enable.

9. Apparatus according to claim 1, wherein said contactless communication for which said chip card is configured is a passive communication and wherein said contactless communication which said communication means are configured to enable is an active communication.

10. Apparatus according to claim 1, wherein said apparatus comprises energy supply means.

11. Apparatus according to claim 1, wherein said communication means are configured to enable a Bluetooth communication with said second hardware interface.

12. Apparatus according to claim 1, wherein said contactless communication for which said chip card is configured is a near field communication.

13. Apparatus according to claim 1, wherein said apparatus comprises additional communication means configured to enable said contactless communication of said chip card with said first hardware interface.

14. Apparatus according to claim 13, wherein said additional communication means are at least partially deactivatable.

15. Apparatus according to claim 1, wherein said chip card is received in said apparatus.

16. Apparatus according to claim 15, wherein said chip card is received permanently in said apparatus.

17. Apparatus according to claim 1, wherein said apparatus is part of a vehicle key.

18. Method, said method comprising:
using the apparatus according to claim 1 for authentication to a vehicle locking system.

* * * * *